(12) United States Patent
Lyu et al.

(10) Patent No.: US 11,898,026 B2
(45) Date of Patent: Feb. 13, 2024

(54) AIR-CURABLE ETHYLENE/ALPHA-OLEFIN/DIENE INTERPOLYMER COMPOSITION

(71) Applicant: Dow Global Technologies LLC, Midland, MI (US)

(72) Inventors: Bo Lyu, Shanghai (CN); Yabin Sun, Shanghai (CN); Tao Han, Shanghai (CN); Jozef Van Dun, Horgen (CH); Colin LiPiShan, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 385 days.

(21) Appl. No.: 16/652,123

(22) PCT Filed: Nov. 8, 2017

(86) PCT No.: PCT/CN2017/104810
§ 371 (c)(1),
(2) Date: Mar. 30, 2020

(87) PCT Pub. No.: WO2019/090448
PCT Pub. Date: May 16, 2019

(65) Prior Publication Data
US 2020/0263018 A1 Aug. 20, 2020

(51) Int. Cl.
*C08L 23/16* (2006.01)
*C08K 5/14* (2006.01)
*C08K 5/3435* (2006.01)

(52) U.S. Cl.
CPC .............. *C08L 23/16* (2013.01); *C08K 5/14* (2013.01); *C08K 5/3435* (2013.01); *C08L 2312/02* (2013.01)

(58) Field of Classification Search
CPC .................................................... C08L 23/16
See application file for complete search history.

(56) References Cited

U.S. PATENT DOCUMENTS

| | | | |
|---|---|---|---|
| 5,919,871 A | 7/1999 | Nicol et al. | |
| 6,255,448 B1 | 7/2001 | Grimaldi et al. | |
| 6,784,240 B2 | 8/2004 | Hasegawa et al. | |
| 7,226,964 B2 | 6/2007 | Debaud et al. | |
| 7,465,769 B2* | 12/2008 | Esseghir | C08F 2/38 525/331.3 |
| 7,829,634 B2 | 11/2010 | Debaud et al. | |
| 2005/0197457 A1 | 9/2005 | Chaudhary et al. | |
| 2007/0145625 A1* | 6/2007 | Caronia | C08J 3/247 264/236 |
| 2007/0149626 A1* | 6/2007 | Cheung | C08L 23/0861 521/50 |
| 2007/0173613 A1 | 7/2007 | Chaudhary et al. | |
| 2015/0274867 A1* | 10/2015 | LiPiShan | C08L 23/16 428/36.9 |

FOREIGN PATENT DOCUMENTS

| | | |
|---|---|---|
| CN | 1898339 A | 1/2007 |
| CN | 101522772 A | 9/2009 |
| JP | 2014-159505 A | 9/2014 |
| WO | 0228946 A1 | 4/2002 |

OTHER PUBLICATIONS

Bis-(2,2,6,6-tetramethyl-1-piperidinyloxy-4-yl)sebacate flyer (Year: NA).*

* cited by examiner

*Primary Examiner* — Irina Krylova
(74) *Attorney, Agent, or Firm* — Boyle Fredrickson, S.C.

(57) ABSTRACT

A composition comprises (A) an ethylene/alpha-olefin/diene interpolymer; (B) a peroxide comprising at least one peroxide bond; and (C) a bis-TEMPO compound having the Structure (I), wherein $R^{1-4}$ are each independently H or a $C_1$-$C_6$ alkyl group; X is S, O, N, P, Se, a carbonyl group, a carboxyl group, an amide group, an azo group, an imino group, a carbamate group, a peroxy group, a phosphono group, a phosphate group, a sulfonyl group, a sulfinyl group, a sulfonate ester group, a sulfonate ester group, or combinations thereof; Y is a substitute or unsubstituted aliphatic alkyl group or aromatic alkyl group, a heterocyclic group, a siloxane group, an ethylene glycol group, an imide group, or combinations thereof; and n is greater than 1. The ratio of the molar amount of nitroxide groups of component (C) to the molar amount of the peroxide bonds of component (B) is from 0.100:1.000 to 2.000:1.000.

7 Claims, 1 Drawing Sheet

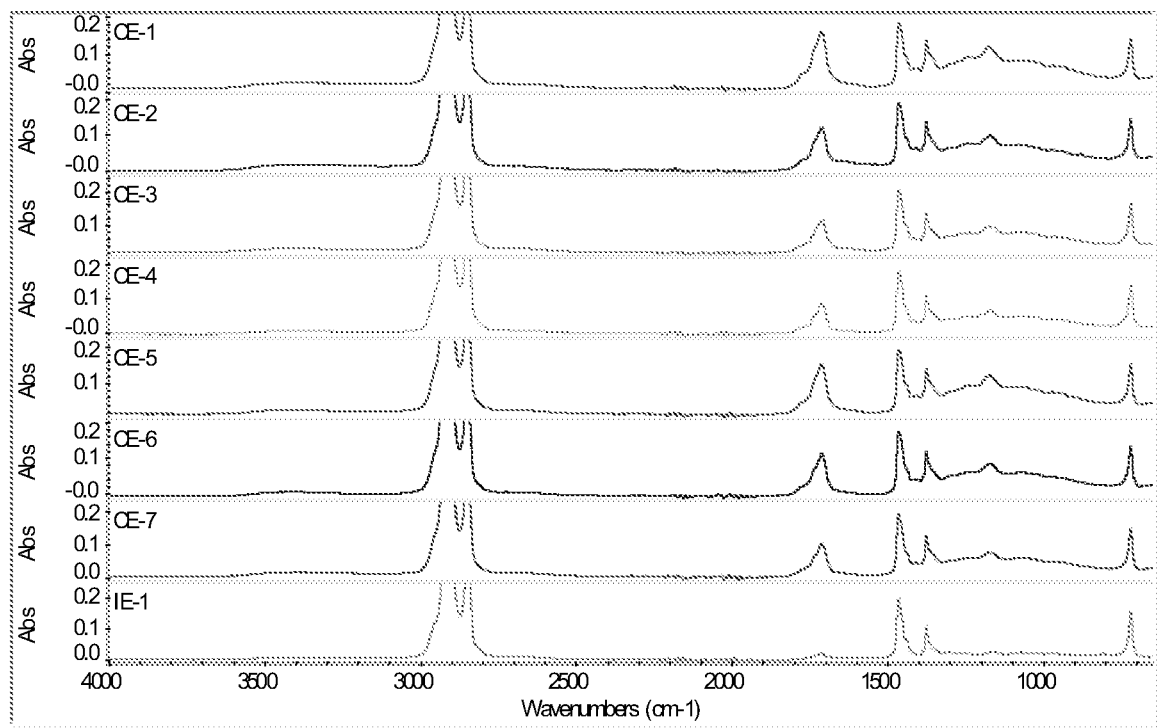

AIR-CURABLE ETHYLENE/ALPHA-OLEFIN/DIENE INTERPOLYMER COMPOSITION

BACKGROUND OF THE INVENTION

There are presently two main vulcanization methods for ethylene/alpha-olefin/diene interpolymers (EAODM), such as ethylene propylene diene monomer (EPDM) polymers. Until recently, sulfur vulcanization was the primary method of vulcanizing EAODMs. Due to certain drawbacks with sulfur vulcanization, peroxide vulcanization is currently growing in popularity.

Sulfur vulcanization is completed under atmosphere, meaning the process is simpler and uses simpler equipment. However, the C—S and S—S bonds formed during sulfur vulcanization are weaker than the C—C bonds formed during peroxide vulcanization, and the resulting sulfur-vulcanized EPDM compositions have reduced compression set values and longevity compared to the peroxide-vulcanized EPDM compositions.

Peroxide vulcanization is typically completed in the absence of oxygen. When EPDM is vulcanized via peroxide under atmosphere, carbon radicals react with oxygen followed by degradation to polar functionalities, e.g., carboxylic acids, carbonyl, esters, etc. These polar species create a tacky surface. Surface tackiness is an issue particularly when de-molding of final products is completed at high temperatures. To reduce surface tackiness, peroxide vulcanization uses more expensive and complicated equipment to remove oxygen from the vulcanization environment.

There is a need for new EPDM compositions which are air curable and provide improved mechanical properties and longevity.

U.S. Pat. No. 7,829,634 disclosed a peroxide vulcanization process using nitroxides such as 4-hydroxy-TEMPO as a scorch retardant. U.S. Pat. No. 7,226,964 disclosed compositions containing a nitroxide and a crosslinking promotor having at least one double bond as scorch retardants for crosslinking processes.

JP 2014-159505 disclosed a formulation containing a rubber component, peroxide, a nitroxide, and trimethylol-propane trimethacrylate or trimethylol-propane triacrylate for use as a battery sealing material.

U.S. Pat. No. 7,829,634 disclosed a formulation containing a rubber component, peroxide, and bis-TEMPO components as scorch retardants.

However, as discussed above, there is a need for new EPDM compositions which are air curable and provide improved mechanical properties and longevity.

SUMMARY OF THE INVENTION

The invention provides a composition comprising (A) an ethylene/alpha-olefin/diene interpolymer; (B) a peroxide comprising at least one —O—O— peroxide bond; and (C) a bis-TEMPO compound having the Structure I:

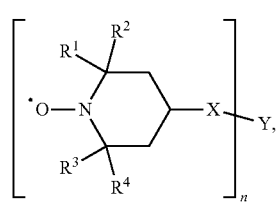

(Structure I)

wherein $R^1$, $R^2$, $R^3$ and $R^4$ are each independently selected from the group consisting of H and $C_1$-$C_6$ alkyl groups; X is selected from the group consisting of S, O, N, P, Se, a carbonyl group (C=O), a carboxyl group (O—C=O), an amide group (N—C=O), an azo group (N=N), an imino group (C=N), a carbamate group (N—C=O), a peroxy group (O—O), a phosphono group (—(O)$_2$P=O), a phosphate group (O=P—(O)$_3$), a sulfonyl group ((O=))$_2$S), a sulfinyl group (O=S), a sulfonate ester group ((O=)$_2$S—O), a sulfonate ester group (O=S—O), and combinations thereof; Y is selected from the group consisting of a substitute or unsubstituted aliphatic alkyl group, a substituted or unsubstituted aromatic alkyl group, a heterocyclic group, a siloxane group, an ethylene glycol group, an imide group, and combinations thereof; and n is greater than 1, and wherein the ratio of the molar amount of nitroxide (NO·) groups of component (C) to the molar amount of the peroxide bonds of component (B) is from 0.100:1.000 to 2.000:1.000.

BRIEF DESCRIPTION OF THE FIGURES

FIG. 1 depicts the IR spectra of Comparative Samples 1-7 and Inventive Example 1.

DEFINITIONS

Unless stated to the contrary, implicit from the context, or customary in the art, all parts and percents are based on weight, and all test methods are current as of the filing date of this disclosure.

"Alkyl" refers to a saturated linear, cyclic, or branched hydrocarbon group. Nonlimiting examples of suitable alkyl groups include, for example, methyl, ethyl, n-propyl, i-propyl, n-butyl, t-butyl, i-butyl (or 2-methylpropyl), etc. In one embodiment, the alkyls have 1 to 20 carbon atoms. "Substituted alkyl," refers to an alkyl in which one or more hydrogen atom bound to any carbon of the alkyl is replaced by another group such as a halogen, aryl, substituted aryl, cycloalkyl, substituted cycloalkyl, heterocycloalkyl, substituted heterocycloalkyl, halogen, haloalkyl, hydroxy, amino, phosphido, alkoxy, amino, thio, nitro, and combinations thereof. Suitable substituted alkyls include, for example, benzyl, trifluoromethyl and the like. "Heteroalkyl" refers to an alkyl as described above in which one or more carbon atoms to any carbon of the alkyl is replaced by a heteroatom selected from the group consisting of N, O, P, B, S, Si, Sb, Al, Sn, As, Se and Ge. This same list of heteroatoms is useful throughout this specification. The bond between the carbon atom and the heteroatom may be saturated or unsaturated. Thus, an alkyl substituted with a heterocycloalkyl, substituted heterocycloalkyl, heteroaryl, substituted heteroaryl, alkoxy, aryloxy, boryl, phosphino, amino, silyl, thio, or seleno is within the scope of the term heteroalkyl. Suitable heteroalkyls include cyano, benzoyl, 2-pyridyl, 2-furyl and the like.

The term "composition," as used herein, includes the material(s), which comprise the composition, as well as reaction products and decomposition products formed from the materials of the composition. Any reaction product or decomposition product is typically present in trace or residual amounts.

A "heteroatom" is an atom other than carbon or hydrogen. The heteroatom can be a non-carbon atom from Groups IV, V, VI and VII of the Periodic Table. Nonlimiting examples of heteroatoms include: F, N, O, P, B, S, and Si.

The term "polymer," as used herein, refers to a compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts of impurities, such as catalyst residues, can be incorporated into and/or within the polymer.

The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term "ethylene/α-olefin/diene interpolymer," as used herein, refers to a polymer that comprises, in polymerized form, ethylene, an α-olefin, and a diene. In one embodiment, the "ethylene/α-olefin/diene interpolymer" comprises a majority weight percent of ethylene (based on the weight of the interpolymer).

The "molar amount of nitroxide groups" is calculated by the equation:

molar amount of nitroxide groups in peroxide=$g_t$*mole$_t$/g*(number of nitroxide groups)

wherein $g_t$ is the amount of bis-TEMPO compound in grams, mole$_t$/g is the moles of bis-TEMPO compound in one gram, and the number of nitroxide groups is the number of nitroxide groups in one bis-TEMPO molecule.

The "molar amount of the peroxide bonds" is calculated by the equation:

molar amount of peroxide bonds=$g_p$*mole$_p$/g*(number of peroxide bonds)

wherein $g_p$ is the amount of peroxide in grams, mole$_p$/g is the moles of peroxide per gram, and the number of peroxide bonds is the number of —O—O— bonds in one peroxide molecule.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or," unless stated otherwise, refers to the listed members individually as well as in any combination. Use of the singular includes use of the plural and vice versa.

The numerical ranges disclosed herein include all values from, and including, the lower and upper value. For ranged containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

Test Methods

FTIR Method for EPDM Composition Analysis

The terpolymers containing ethylene, propylene, and 5-ethylidene-2-norbornene were analyzed using ASTM D3900 for their respective ethylene contents and ASTM D6047 for their ethylidene-norbornene or dicyclopentadiene contents.

Density

Density is determined in accordance with ASTM D792, Method B. The results are recorded in grams (g) per cubic centimeter (g/cc or g/cm$^2$).

Rheology Ratio

The rheology ratio (RR) (V0.1/V100) is determined by examining samples using melt rheology techniques on a Rheometric Scientific, Inc. ARES (Advanced Rheometric Expansion System) dynamic mechanical spectrometer (DMS). The samples are examined at 190° C., using the dynamic frequency mode, and 25 millimeter (mm) diameter parallel plate fixtures with a 2 mm gap. With a strain rate of 8%, and an oscillatory rate that is incrementally increased from 0.1 to 100 rad/sec, five data points are taken for each decade of frequency analyzed. Each sample (either pellets or bale) is compression molded into 3 inch (7.62 centimeter (cm)) diameter plaques by ⅛ inch (0.049 cm) thick at 20,000 psi (137.9 megaPascals (MPa)) pressure for one minute at 180° C. The plaques are quenched and cooled (over a period of 1 minute) to room temperature. The "25 mm plaques" are cut from the center portion of larger plaques. These 25 mm diameter aliquots are then inserted into the ARES, at 190° C., and allowed to equilibrate for five minutes, prior to initiation of testing. The samples are maintained in a nitrogen environment throughout the analyses to minimize oxidative degradation. Data reduction and manipulation are accomplished by the ARES2/A5:RSI Orchestrator Windows 95 based software package. RR measures the ratio of the viscosity versus shear rate curve.

Viscosity

Viscosity refers to the resistance of a fluid which is being deformed by either sheer stress or tensile stress. For purposes of this specification, viscosity is measured at 190° C. using a Brookfield viscometer as measured in accordance with ASTM D 445.

Mooney Viscosity

Mooney Viscosity (ML1+4 at 125° C.) was measured in accordance with ASTM 1646, with a one minute preheat time and a four minute rotor operation time. The instrument is an Alpha Technologies Mooney Viscometer 2000.

The viscosity of each formulated composition is measured using an uncured blanket (see experimental section), so that the viscosity of the uncured composition could be examined. Samples were conditioned for 24 hours at room temperature, prior to testing.

Molecular Weight and Molecular Weight Distribution for Polymer

Molecular weight is determined using gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 mL/min and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by T. Williams & I. M. Ward, *The Construction of a Polyethylene Calibration Curve for Gel Permeation Chro-*

*matography Using Polystyrene Fractions,* 6 J. Polymer Sci. Pt. B: Polymer Letter 621, 621-624 (1968)) to derive the following equation:

$$M_{polyethylene} = a \times (M_{polystyrene})^b$$

In this equation, a=0.4316 and b=1.0.

Number average molecular weight, $M_n$, of a polymer is expressed as the first moment of a plot of the number of molecules in each molecular weight range against the molecular weight. In effect, this is the total molecular weight of all molecules divided by the number of molecules and is calculated in the usual matter according to the following formula:

$$M_n = \Sigma n_i \times M_i / \Sigma n_i = \Sigma w_i / \Sigma(w_i/M_i)$$

where $n_i$=number of molecules with molecular weight $M_i$; $w_i$=weight fraction of material having molecular weight $M_i$; and $\Sigma n_i$=total number of molecules.

Weight average molecular weight, $M_w$, is calculated in the usual manner according to the following formula: $M_w = w_i \times M_i$, where $w_i$ and $M_i$ are the weight fraction and molecular weight, respectively, of the $i^{th}$ fraction eluting from the GPC column.

The ratio of these two averages, the molecular weight distribution (MWD or $M_w/M_n$), defines the breadth of the molecular weight distribution.

Moving Die Rheometer (MDR) Analysis

MDR cure properties of each formulation are measured in accordance to ASTM D-5289, using an Alpha Technologies MDR 2000. A 4.5 g sample is cut from the compression molded sample and put in the MDR. The MDR test is carried out at 180° C. over a period of 30 minutes at an oscillation frequency of 100 CPM (1.67 Hz) and an oscillation angle of 0.5 degree (7% strain). The minimum torque (ML) maximum torque (MH) exerted by the MDR during the testing interval are reported in dNm. The difference between MH and ML is indicative of the extent of crosslinking, with the greater the difference reflecting a greater extent of crosslinking. The time it takes for torque to reach X % of MH ($t_x$) is reported in minutes. The time required for the increase of 1 (ts1) or 2 (ts2) points from minimum torque is recorded in minutes. The ts1 and ts2 values are indicative of the time required for the crosslinking process to begin. A shorter time indicates crosslinking initiates faster.

FTIR-ATR Analysis (Vulcanized Samples)

The degradation of the hot air vulcanized samples is determined by FTIR-ATR Analysis. Methylene groups ($CH_2$) signal around 1460 $cm^{-1}$ and are used as the industry standard. Carbonyl groups (C=O) signal around 1717 $cm^{-1}$ and are used to monitor the degradation degree. The height ratio between 1714 $cm^{-1}$ and 1460 $cm^{-1}$ represents the degradation degree:

$$D = \frac{H_{1714}}{H_{1460}}$$

wherein D is the degradation degree, $H_{1714}$ is the IR peak height at 1714 $cm^{-1}$ (using 1845-1542 $cm^{-1}$ as a baseline), and $H_{1460}$ is the IR peak height at 1460 $cm^{-1}$ (using 1583-1396 $cm^{-1}$ as a baseline).

Relative degradation degree is calculated according to the formula below:

$$RD = \frac{D}{D_0}$$

wherein RD is the relative degradation degree, D is the degradation degree of the tested specimen, and $D_0$ is the degradation degree of CS1 (control).

Finger Test (Surface Tackiness)

The hot air vulcanized samples are tested for surface tackiness using the Finger Test. The Finger Test is a laboratory qualitative test method. Laboratory testers use their fingers to touch the vulcanized sample and provide feedback regarding the surface tackiness of the sample using the following criteria:

| Tackiness Rating | Tester Feeling |
|---|---|
| 3 | Surface is not tacky, feels like normal rubber sheet |
| 2 | Only a little tackiness could be felt by finger |
| 1 | Surface felt like adhesive tape |

DETAILED DESCRIPTION OF THE INVENTION

As discussed above, the invention provides a composition comprising (A) an ethylene/alpha-olefin/diene interpolymer; (B) a peroxide comprising at least one —O—O-peroxide bond; and (C) a bis-TEMPO compound having the Structure I:

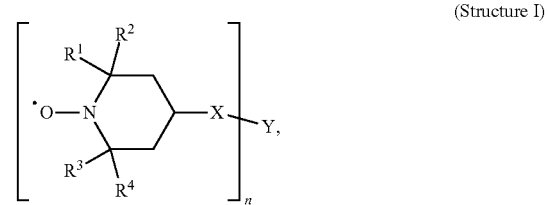

(Structure I)

wherein $R^1$, $R^2$, $R^3$ and $R^4$ are each independently selected from H and $C_1$-$C_6$ alkyl groups; X is selected from S, O, N, P, Se, a carbonyl group (C=O), a carboxyl group (O—C=O), an amide group (N—C=O), an azo group (N=N), an imino group (C=N), a carbamate group (N—C=O), a peroxy group (O—O), a phosphono group (—(O)$_2$P=O), a phosphate group (O=P—(O)$_3$), a sulfonyl group ((O=)$_2$S), a sulfinyl group (O=S), a sulfonate ester group ((O=)$_2$S—O), a sulfonate ester group (O=S—O), and combinations thereof; Y is selected from a substituted or unsubstituted aliphatic alkyl group, a substituted or unsubstituted aromatic alkyl group, a heterocyclic group, a siloxane group, an ethylene glycol group, an imide group, and combinations thereof; and n is greater than 1, and wherein the ratio of the molar amount of nitroxide (NO·) groups of component (C) to the molar amount of the peroxide bonds of component (B) is from 0.100:1.000 to 2.000:1.000.

The composition may comprise a combination of two or more embodiments described herein.

The invention also provides a vulcanized, or crosslinked, composition formed from a composition of one or more embodiments described herein.

The invention also provides an article comprising at least one component formed from a composition of one or more embodiments described herein. In a further embodiment, the article is selected from the group consisting of profiles, injection molded parts, gaskets, automotive parts, building and construction materials, shoe components, and tubes.

In one embodiment, the article is an automotive part.

The invention also provides an article comprising at least one component formed from a crosslinked composition of one or more embodiments described herein. In a further embodiment, the article is selected from the group consisting of profiles, injection molded parts, gaskets, automotive parts, building and construction materials, shoe components, and tubes.

The composition may comprise a combination of two or more embodiments described herein.

An article may comprise a combination of two or more embodiments described herein.

Ethylene/Alpha-Olefin/Diene Interpolymer (EAODM)

The composition includes an ethylene/alpha-olefin/diene interpolymer. The ethylene/alpha-olefin/diene interpolymer comprises, in polymerized form, a majority amount of ethylene, an alpha-olefin, and a diene.

In an embodiment, the EAODM comprises from 30 wt %, or 40 wt %, or 50 wt %, or 55 wt %, or 60 wt %, or 65 wt %, or 70 wt %, or 75 wt % to 80 wt %, or 85 wt %, or 90 wt %, or 95 wt % ethylene, based on the total weight of the EAODM, as measured according to FTIR analysis.

The alpha-olefin may be either an aliphatic or an aromatic compound. In an embodiment, the alpha-olefin is preferably a $C_3$-$C_{20}$ aliphatic compound, or a $C_3$-$C_{16}$ aliphatic compound, or a $C_3$-$C_{10}$ aliphatic compound. Exemplary $C_3$-$C_{10}$ aliphatic alpha-olefins are propylene, 1-butene, 1-hexene and 1-octene. In an embodiment, the alpha-olefin is propylene.

In an embodiment, the EAODM comprises from 10 wt %, or 12 wt %, or 15 wt %, or 18 wt %, or 20 wt %, or 22 wt %, or 25 wt % to 28 wt %, or 30 wt %, or 32 wt %, or 35 wt % alpha-olefin, based on the total weight of the EAODM, as measured according to FTIR analysis.

Illustrative dienes include straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. In an embodiment, the diene is selected from ENB, dicyclopentadiene, 1,4-hexadiene, 7-methyl-1,6-octadiene, and preferably, ENB, dicyclopentadiene and 1,4-hexadiene. In an embodiment, the diene is selected from ENB and dicyclopentadiene. In an embodiment, the diene is ENB.

In an embodiment, the EAODM comprises from greater than 0 wt %, or 0.5 wt %, or 1 wt %, or 2 wt %, or 2.5 wt %, or 3 wt %, or 3.5 wt %, or 4 wt %, or 4.5 wt %, or 5 wt % to 5.5 wt %, or 6 wt %, or 6.5 wt %, or 7 wt %, or 7.5 wt %, or 8 wt %, or 9 wt %, or 10 wt % diene, based on the total weight of the EAODM, as measured according to FTIR analysis.

In an embodiment, the ethylene/alpha-olefin/diene interpolymer is an ethylene/propylene/diene interpolymer (EPDM). In a further embodiment, the diene is ENB.

In an embodiment, the density of the EAODM is from 0.860 g/cc, 0.865 g/cc to 0.870 g/cc, or 0.880 g/cc, or 0.890 g/cc, or 0.900 g/cc.

In one embodiment, the EAODM has a rheology ratio (V0.1/V100 at 190° C.) from greater than or equal to 20, or greater than or equal to 30, or greater than or equal to 40, or greater than or equal to 50 to 60, or 70, or 80. The rheology ratio (V0.1/V100 at 190° C.) of the EAODM is that of the neat polymer (no oil, no filler). The interpolymer may be stabilized with "ppm amounts" of one or more antioxidants and/or other stabilizers.

In one embodiment, the EAODM has a viscosity at 0.1 rad/sec, 190° C., from 120,000 Pa·s, or 130,000 Pa·s, or 140,000 Pa·s to 180,000 Pa·s, or 190,000 Pa·s, or 200,000 Pa·s.

In one embodiment, the EAODM comprises from 3.0 weight percent (wt %), or 4.0 wt %, or 5.0 wt % to 7.0 wt %, or 10.0 wt %, or 12.0 wt % diene, based on the weight of the interpolymer.

In one embodiment, the EAODM has a Mooney Viscosity greater than or equal to 10, or greater than or equal to 15, or greater than or equal to 20, or greater than or equal to 25, or greater than or equal to 30, or greater than or equal to 35, or greater than or equal to 40 to less than or equal to 60, or less than or equal to 70, or less than or equal to 80, or less than or equal to 85, or less than or equal to 90, or less than or equal to 100 (ML 1+4, 125° C.). Mooney viscosity is that of the neat polymer (no oil, no filler). The polymer may be stabilized with "ppm amounts" of one or more antioxidants and/or other stabilizers.

In one embodiment, the EAODM has a molecular weight distribution (MWD, or Mw/Mn) greater than or equal to 1.2, or greater than or equal to 1.5, or greater than or equal to 1.7, or greater than or equal to 1.8, or greater than or equal to 2.0, or greater than or equal to 2.2 to less than or equal to 2.5, or less than or equal to 3.0, or less than or equal to 3.5, or to less than or equal to 4.0, or to less than or equal to 5.0.

In one embodiment, the EAODM has a weight average molecular weight (Mw) from 80,000 g/mol, or 100,000 g/mol to less than or equal to 200,000 g/mol, or less than or equal to 300,000 g/mol, or less than or equal to 400,000 g/mol.

In an embodiment, the EAODM has one, some or all of the following properties:
(i) a density from 0.865 g/cc, or 0.870 g/cc to 0.875 g/cc, or 0.880 g/cc, or 0.885 g/cc; and/or
(ii) an ethylene content from 60 wt %, or 65 wt % to 70 wt %, or 75 wt %, based on the total weight of the EAODM; and/or
(iii) a diene content from 4 wt %, or 4.5 wt % to 5 wt %, or 5.5 wt %, based on the total weight of the EAODM; and/or
(iv) a Mooney viscosity from greater than or equal to 20, or greater than or equal to 25, or greater than or equal to 30, or greater than or equal to 35, or greater than or equal to 40 to less than or equal to 60, or less than or equal to 70.

In an embodiment, the EAODM has, at least two, or at least three, or all four of properties (i)-(iv).

In an embodiment, the EAODM has two properties of (i)-(iv). In an embodiment, the EAODM has properties (i) and (ii), or (i) and (iii), or (i) and (iv), or (ii) and (iii), or (ii) and (iv), or (iii) and (iv).

In an embodiment, the EAODM has three properties of (i)-(iv). In an embodiment, the EAODM has properties (i), (ii) and (iii); or (i), (ii) and (iv); or (i), (iii) and (iv); or (ii), (iii) and (iv).

In an embodiment, the EAODM has all four properties (i)-(iv).

In an embodiment, the EAODM is an EPDM having one, some or all of the following properties:
(i) a density from 0.865 g/cc, or 0.870 Wee to 0.875 g/cc, or 0.880 g/cc, or 0.885 Wee; and/or
(ii) an ethylene content from 60 wt %, or 65 wt % to 70 wt %, or 75 wt %, based on the total weight of the EPDM; and/or
(iii) an ENB content from 4 wt %, or 4.5 wt % to 5 wt %, or 5.5 wt %, based on the total weight of the EPDM; and/or
(iv) a Mooney viscosity from greater than or equal to 20, or greater than or equal to 25, or greater than or equal to 30, or greater than or equal to 35, or greater than or equal to 40 to less than or equal to 60, or less than or equal to 70.

In an embodiment, the EPDM has, at least two, or at least three, or all four of properties (i)-(iv).

In an embodiment, the EAODM has two properties of (i)-(iv). In an embodiment, the EAODM has properties (i) and (ii), or (i) and (iii), or (i) and (iv), or (ii) and (iii), or (ii) and (iv), or (iii) and (iv).

In an embodiment, the EAODM has three properties of (i)-(iv). In an embodiment, the EAODM has properties (i), (ii) and (iii); or (i), (ii) and (iv); or (i), (iii) and (iv); or (ii), (iii) and (iv).

In an embodiment, the EAODM has all four properties (i)-(iv).

Nonlimiting examples of commercially available EAODMs include NORDEL IP 4725, an ethylene/propylene/ENB terpolymer having a density of 0.88 g/cc, an ethylene content of 70 wt %, an ENB content of 4.9 wt %, and a Mooney viscosity of 25, available from the Dow Chemical Company, and NORDEL IP 4760, an ethylene/propylene/ENB terpolymer having a density of 0.88 g/cc, an ethylene content of 67 wt %, an ENB content of 4.9 wt %, and a Mooney viscosity of 60, available from the Dow Chemical Company.

In one embodiment, the EAODM is present in the composition in an amount from greater than or equal to 50 wt %, or greater than or equal to 75 wt %, or greater than or equal to 90 wt %, or greater than or equal to 95 wt % to 96 wt %, or 97 wt %, or 98 wt %, or 99 wt %, or 99.5 wt %, or 99.75 wt %, based on the total weight of the composition.

In an embodiment, the composition may include a mixture of two or more EAODM as described herein. In an embodiment, the sum total amount of all EAODM in the composition is from greater than or equal to 50 wt %, or greater than or equal to 75 wt %, or greater than or equal to 90 wt %, or greater than or equal to 95 wt % to 96 wt %, or 97 wt %, or 98 wt %, or 99 wt %, or 99.5 wt %, or 99.75 wt %, based on the total weight of the composition.

The EAODM, further an EPDM, may comprise a combination of two or more embodiments as described herein.

Peroxide

The composition includes a peroxide comprising at least one peroxide (—O—O—) bond.

Suitable peroxides include, but are not limited to, aromatic dacyl peroxides; aliphatic dacyl peroxides; dibasic acid peroxides; ketene peroxides; alkyl peroxyesters; alkyl hydroperoxides, for example, diacetylperoxide; dibenzoylperoxide; bis-2,4-dichlorobenzoyl peroxide; di-tert-butyl peroxide; dicumylperoxode; tert-butyl-perbenzoate; tert-butyl-cumylperoxide; 2,5-bis(t-butylperoxy)-2,5-dimethylhexane; 2,5-bis(t-butylperoxy)-2,5-dimethylhexyne-3; 4,4,4',4'-tetra-(t-butylperoxy)-2,2-dicyclohexylpropane; 1,4-bis-(t-butylperoxyisopropyl)-benzene; 1,1-bis-(t-butylperoxy)-3,3,5-trimethyl-cyclohexane; lauroyl peroxide; succinic acid peroxide; cyclohexanone peroxide; t-butyl peracetate; butyl hydroperoxide; 2,5-dimethyl-2,5-di(t-butylperoxy)hexane; and combinations thereof.

In an embodiment, the peroxide is present in an amount from greater than 0 wt %, or 0.5 wt %, or 1.0 wt %, or 1.25 wt %, or 1.50 wt %, or 1.75 wt % to 2.00 wt %, or 2.25 wt %, or 2.50 wt %, or 2.75 wt %, or 3.00 wt %, or 3.5 wt %, or 4.0 wt %, or 5.0 wt %, based on the total weight of the composition.

In an embodiment, the peroxide is present in an amount from 1.40 wt %, or 1.41 wt %, or 1.42 wt %, or 1.43 wt %, or 1.44 wt %, or 1.45 wt %, or 1.46 wt % to 1.47 wt %, or 1.48 wt %, or 1.49 wt %, or 1.50 wt %, based on the total weight of the composition.

A peroxide may comprise a combination of two or more embodiments as described herein.

Bis-TEMPO Compound

The composition includes a bis-TEMPO compound having the Structure I:

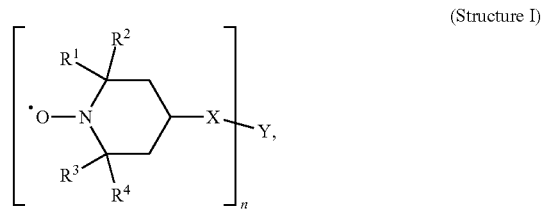

(Structure I)

wherein $R^1$, $R^2$, $R^3$ and $R^4$ are each independently selected from H and $C_1$-$C_6$ alkyl groups; X is selected from S, O, N, P, Se, a carbonyl group (C=O), a carboxyl group (O—C=O), an amide group (N—C=O), an azo group (N=N), an imino group (C=N), a carbamate group (N—C=O), a peroxy group (O—O), a phosphono group (—(O)$_2$P=O), a phosphate group (O=P—(O)$_3$), a sulfonyl group ((O=)$_2$S), a sulfinyl group (O=S), a sulfonate ester group ((O=)$_2$S—O), a sulfonate ester group (O=S—O), and combinations thereof; Y is selected from a substituted or unsubstituted aliphatic alkyl group, a substituted or unsubstituted aromatic alkyl group, a heterocyclic group, a siloxane group, an ethylene glycol group, an imide group, and combinations thereof; and n is greater than 1. In an embodiment, each of $R^1$, $R^2$, $R^3$ and $R^4$ are the same. In an embodiment, at least one of $R^1$, $R^2$, $R^3$ and $R^4$ is different than the others of $R^1$, $R^2$, $R^3$ and $R^4$.

In an embodiment, $R^1$, $R^2$, $R^3$ and $R^4$ are the same. In an embodiment, $R^1$, $R^2$, $R^3$ and $R^4$ are the same and selected from H and a methyl group. In an embodiment, $R^1$, $R^2$, $R^3$ and $R^4$ are each a methyl group.

In an embodiment, X is a carboxyl group.

In an embodiment, Y is a substituted or unsubstituted aliphatic alkyl group or a substituted or unsubstituted aromatic alkyl group having from 1, or 2, or 5 to 8, or 10, or 20, or 30 carbon atoms.

In an embodiment, Y is an aliphatic $C_1$-$C_{10}$ alkyl.

In an embodiment, Y is an aliphatic $C_8$ alkyl.

In an embodiment, n is from 2 to 4. In an embodiment, n is 2.

In an embodiment, the bis-TEMPO compound is bis(2,2,6,6-tetramethyl-1-piperidinyloxy-4-yl) sebacate (CAS 2516-92-9) and has the Structure II:

(Structure II)

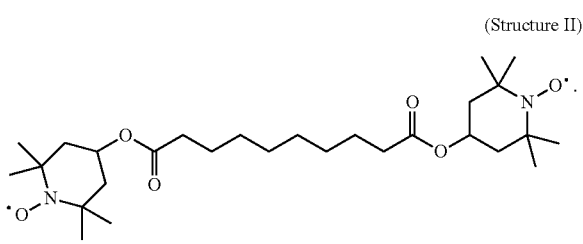

In an embodiment, the bis-TEMPO compound is present in an amount from greater than 0 wt %, or 0.10 wt %, or 0.20 wt %, or 0.25 wt %, or 0.50 wt %, or 0.75 wt %, or 1.00 wt % to 1.25 wt %, or 1.5 wt %, or 1.75 wt %, or 2.0 wt %, or 3.0 wt %, or 4.0 wt %, or 5.0 wt %, based on the total weight of the composition.

A bis-TEMPO compound may comprise a combination of two or more embodiments as described herein.

Optional Additives

In an embodiment, the composition optionally includes one or more additives. Nonlimiting examples of additives include oils, fillers, processing aids, and/or stabilizers.

In one embodiment, the composition includes one or more oils. In an embodiment, the weight ratio of the first composition to the oil is form 2/1 to 4/1. Oils include, but are not limited to, petroleum oils, such as paraffinic, aromatic and naphthenic oils; polyalkylbenzene oils; organic acid monoesters; and combinations thereof.

In one embodiment, the composition further comprises one or more fillers. Fillers include, but are not limited to, clay, calcium carbonate, talc, carbon black, silica, mineral fillers, and combinations thereof.

In one embodiment, the composition further comprises one or more processing aids. Processing aids include, but are not limited to, aliphatic acids, mineral aliphatic acid salts, polyethylene glycol, and combinations thereof.

In one embodiment, the composition includes one or more stabilizers. Stabilizers include organic molecules that inhibits oxidation, or a collection of such molecules. The stabilizer functions to provide antioxidizing properties to the EAODM composition and/or crosslinked product. Nonlimiting examples of suitable stabilizers are 2,2,4-trimethyl-1, 2-dihydroquinoline, polymerized (e.g., Vulnanox HS/LG or TMQ); Zinc 2-mercaptotolumidazole (e.g., VANOX ZMTI); bis(4-(1-methyl-1-phenylethyl)phenyl)amine (e.g., NAUGARD 445); 2,2'-methylene-bis(4-methyl-6-t-butylphenol) (e.g., VANOX MBPC); 2,2'-thiobis(2-t-butyl-5-methylphenol (CAS No. 90-66-4, commercially LOWINOX TBM-6); 2,2'-thiobis(6-t-butyl-4-methylphenol (CAS No. 90-66-4, commercially LOWINOX TBP-6); tris[(4-tert-butyl-3-hydroxy-2,6-dimethylphenyl)methyl]-1,3,5-triazine-2,4,6-trione (e.g., CYANOX 1790); pentaerythritol tetrakis(3-(3,5-bis(1,1-dimethylethyl)-4-hydroxyphenyl) propionate (e.g., IRGANOX 1010, CAS Number 6683-19-8); 3,5-bis(1,1-dimethylethyl)-4-hydroxybenzenepropanoic acid 2,2'-thiodiethanediyl ester (e.g., IRGANOX 1035, CAS Number 41484-35-9); and distearyl thiodipropionate ("DSTDP"). When present, the stabilizers may be present in an amount from 0.01 phr, or 0.1 phr, or 0.5 phr to 1.0 phr, or 2.0 phr, or 4 phr.

In an embodiment, the composition further includes one or more processing aids. Nonlimiting examples of suitable processing aids include aliphatic acid, mineral aliphatic acid salts, polyethylene glycol, and combinations thereof.

Composition

The invention provides a composition comprising (A) an ethylene/alpha-olefin/diene interpolymer; (B) a peroxide comprising at least one —O—O— peroxide bond; and (C) a bis-TEMPO compound having the Structure I:

(Structure I)

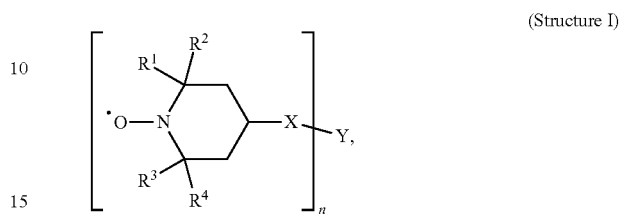

wherein $R^1$, $R^2$, $R^3$ and $R^4$ are each independently selected from H and $C_1$-$C_6$ alkyl groups; X is selected from S, O, N, P, Se, a carbonyl group (C=O), a carboxyl group (O—C=O), an amide group (N—C=O), an azo group (N=N), an imino group (C=N), a carbamate group (N—C=O), a peroxy group (O—O), a phosphono group (—(O)$_2$P=O), a phosphate group (O=P—(O)$_3$), a sulfonyl group ((O=)$_2$S), a sulfinyl group (O=S), a sulfonate ester group ((O=)$_2$S—O), a sulfonate ester group (O=S—O), and combinations thereof; Y is selected from a substituted or unsubstituted aliphatic alkyl group, a substituted or unsubstituted aromatic alkyl group, a heterocyclic group, a siloxane group, an ethylene glycol group, an imide group, and combinations thereof; and n is greater than 1, and wherein the ratio of the molar amount of nitroxide (NO·) groups of component (C) to the molar amount of the peroxide bonds of component (B) is from 0.10 to 2.00.

In an embodiment, the ratio of the molar amount of nitroxide (NO·) groups of component (C) to the molar amount of the peroxide bonds of component (B) is from 0.10, or 0.20 to 0.80, or 0.90, or 1.00, or 1.10, or 1.20, or 1.30, or 1.40, or 1.50, or 1.60, or 1.70, or 1.80, or 1.90, or 2.00.

The ratio of the molar amount of nitroxide (NO·) groups of component (C) to the molar amount of the peroxide bonds of component (B) is calculated according to the following equation:

$$\text{ratio} = \frac{g_t * \dfrac{\text{mole}_t}{g} * (\text{number of nitroxide groups})}{g_p * \dfrac{\text{mole}_p}{g} * (\text{number of peroxide bonds})}$$

wherein $g_t$ is the amount of bis-TEMPO compound in grams, mole$_t$/g is the moles of bis-TEMPO compound in one gram, the number of nitroxide groups is the number of nitroxide groups in one bis-TEMPO molecule, $g_p$ is the amount of peroxide in grams, mole$_p$/g is the moles of peroxide in one gram, and the number of peroxide bonds is the number of peroxide bonds in one peroxide molecule.

In an embodiment, the ratio of the molar amount of nitroxide (NO·) groups of component (C) to the molar amount of the peroxide bonds of component (B) is from 0.100, or 0.150, or 0.170, or 0.175, or 0.180, or 0.185, or 0.200, or 0.250, or 0.300, or 0.350, or 0.400, or 0.450, or 0.500, or 0.550, or 0.600, or 0.650, or 0.700, or 0.750, or 0.800, or 0.850, or 0.900, or 0.950, or 1.000 to 1.050, or 1.100, or 1.150, or 1.200, or 1.250, or 1.300, or 1.350, or 1.400, or 1.450, or 1.500, or 1.550, or 1.600, or 1.650, or 1.700, or 1.750, or 1.800, or 1.850, or 1.900, or 1.950, or 2.000.

In an embodiment, the ratio of the molar amount of nitroxide (NO·) groups of component (C) to the molar amount of the peroxide bonds of component (B) is from 0.100:1.000 to 2.000:1.000, or from 0.150:1.000 to 2.000:1.000, or from 0.170:1.000 to 2.000:1.000, or from 0.170:1.000 to 1.500:1.000, or from 0.170:1.000 to 1.000:1.000, or from 0.175:1.000 to 2.000:1.000, or from 0.175:1.000 to 1.500:1.000, or from 0.175:1.000 to 1.000:1.000, or from 0.180:1.000 to 1.000:1.000, or from 0.180:1.000 to 0.900:1.000, or from 0.180:1.000 to 0.750:1.000, or from 0.180:1.000 to 0.500:1.000, or from 0.180:1.000 to 0.400:1.000, or from 0.185:1.000 to 0.4.00:1.000.

In an embodiment, the composition is prepared by mixing (A) the EAODM, (B) peroxide, and (C) bis-TEMPO compound.

Crosslinked Composition

In an embodiment, the invention provides a crosslinked composition comprising the reaction product of a composition comprising (A) an ethylene/alpha-olefin/diene interpolymer; (B) a peroxide comprising at least one —O—O— peroxide bond; and (C) a bis-TEMPO compound having the Structure I:

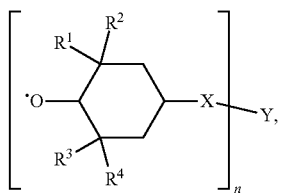

(Structure I)

wherein $R^1$, $R^2$, $R^3$ and $R^4$ are each independently selected from H and $C_1$-$C_6$ alkyl groups; X is selected from S, O, N, P, Se, a carbonyl group (C=O), a carboxyl group (O—C=O), an amide group (N—C=O), an azo group (N=N), an imino group (C=N), a carbamate group (N—C=O), a peroxy group (O—O), a phosphono group (—(O)$_2$P=O), a phosphate group (O=P—(O)$_3$), a sulfonyl group ((O=)$_2$S), a sulfinyl group (O=S), a sulfonate ester group ((O=)$_2$S—O), a sulfonate ester group (O=S—O), and combinations thereof; Y is selected from a substituted or unsubstituted aliphatic alkyl group, a substituted or unsubstituted aromatic alkyl group, a heterocyclic group, a siloxane group, an ethylene glycol group, an imide group, and combinations thereof; and n is greater than 1, and wherein the ratio of the molar amount of nitroxide (NO·) groups of component (C) to the molar amount of the peroxide bonds of component (B) is from 0.100:1.000 to 2.000:1.000.

In an embodiment, the crosslinked EAODM has the structure III:

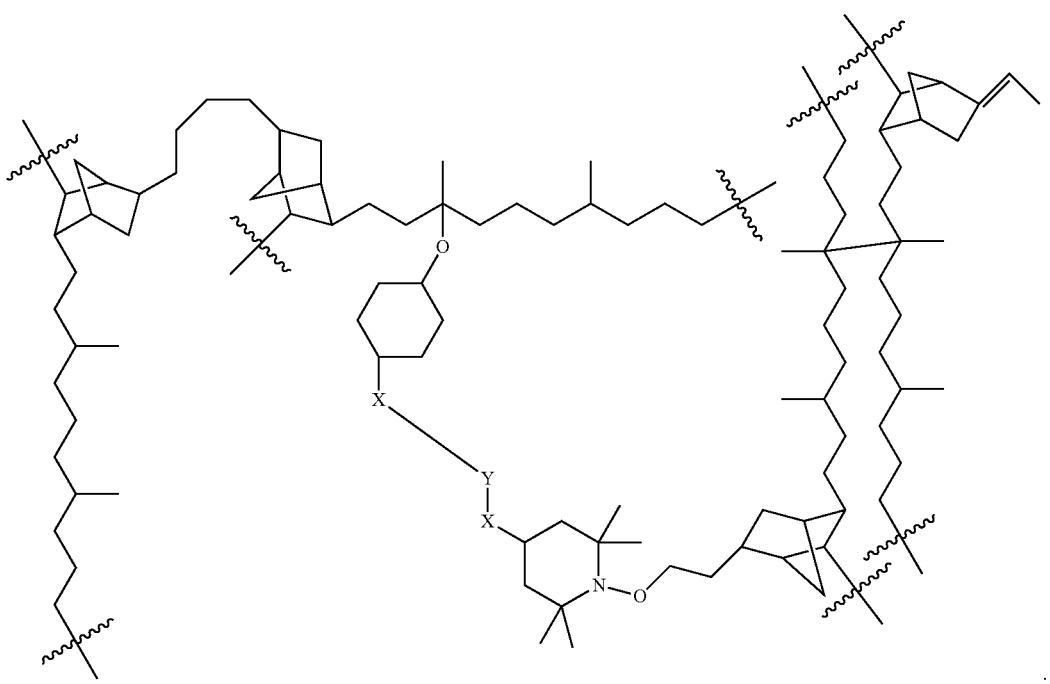

(Structure III)

In an embodiment, the crosslinked composition is formed by thermally treating a composition comprising (A) an ethylene/alpha-olefin/diene interpolymer; (B) a peroxide comprising at least one —O—O— peroxide bond; and (C) a bis-TEMPO compound having the Structure I:

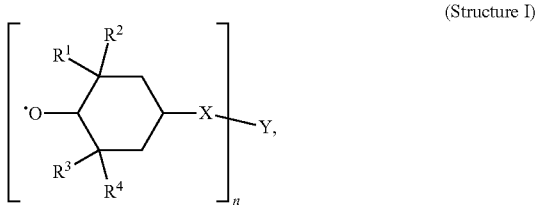

(Structure I)

wherein $R^1$, $R^2$, $R^3$ and $R^4$ are each independently selected from H and $C_1$-$C_6$ alkyl groups; X is selected from S, O, N, P, Se, a carbonyl group (C=O), a carboxyl group (O—C=O), an amide group (N—C=O), an azo group (N=N), an imino group (C=N), a carbamate group (N—C=O), a peroxy group (O—O), a phosphono group (—(O)$_2$P=O), a phosphate group (O=P—(O)$_3$), a sulfonyl group ((O=)$_2$S), a sulfinyl group (O=S), a sulfonate ester group ((O=)$_2$S—O), a sulfonate ester group (O=S—O), and combinations thereof; Y is selected from a substituted or unsubstituted aliphatic alkyl group, a substituted or unsubstituted aromatic alkyl group, a heterocyclic group, a siloxane group, an ethylene glycol group, an imide group, and combinations thereof; and n is greater than 1, and wherein the ratio of the molar amount of nitroxide (NO·) groups of component (C) to the molar amount of the peroxide bonds of component (B) is from 0.100:1.00 to 2.000:1.000.

In an embodiment, the temperature at which the composition is thermally treated to produce the crosslinked composition is from 50° C., or 60° C., or 70° C., or 80° C., or 90° C., or 100° C., or 105° C. to 110° C., or 115° C., or 120° C., or 130° C., or 140° C., or 150° C.

In an embodiment, the crosslinked composition is a thermally treated composition comprising (A) an ethylene/alpha-olefin/diene interpolymer having a diene content from 4 wt %, or 4.5 wt % to 5 wt %, or 5.5 wt %; (B) a peroxide comprising at least one —O—O-peroxide bond; and (C) a bis-TEMPO compound having the Structure I:

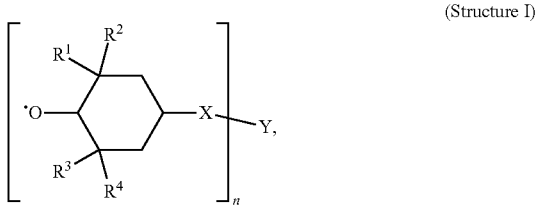

(Structure I)

wherein $R^1$, $R^2$, $R^3$ and $R^4$ are each independently selected from H and $C_1$-$C_6$ alkyl groups; X is selected from S, O, N, P, Se, a carbonyl group (C=O), a carboxyl group (O—C=O), an amide group (N—C=O), an azo group (N=N), an imino group (C=N), a carbamate group (N—C=O), a peroxy group (O—O), a phosphono group (—(O)$_2$P=O), a phosphate group (O=P—(O)$_3$), a sulfonyl group ((O=)$_2$S), a sulfinyl group (O=S), a sulfonate ester group ((O=)$_2$S—O), a sulfonate ester group (O=S—O), and combinations thereof; Y is selected from a substituted or unsubstituted aliphatic alkyl group, a substituted or unsubstituted aromatic alkyl group, a heterocyclic group, a siloxane group, an ethylene glycol group, an imide group, and combinations thereof; and n is greater than 1, and wherein the ratio of the molar amount of nitroxide (NO·) groups of component (C) to the molar amount of the peroxide bonds of component (B) is from 0.100:1.000 to 2.000:1.000 (hereinafter "Crosslinked Composition 1").

In an embodiment, the crosslinked composition is a thermally treated composition comprising (A) an ethylene/propylene/diene interpolymer having a diene content from 4 wt %, or 4.5 wt % to 5 wt %, or 5.5 wt %; (B) a peroxide comprising at least one —O—O— peroxide bond; and (C) a bis-TEMPO compound having the Structure I:

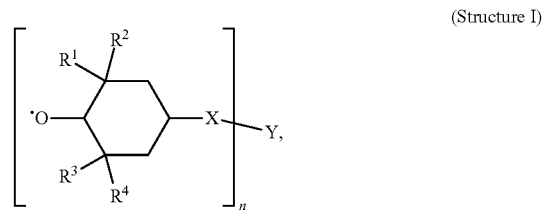

(Structure I)

wherein $R^1$, $R^2$, $R^3$ and $R^4$ are each independently selected from H and $C_1$-$C_6$ alkyl groups; X is selected from S, O, N, P, Se, a carbonyl group (C=O), a carboxyl group (O—C=O), an amide group (N—C=O), an azo group (N=N), an imino group (C=N), a carbamate group (N—C=O), a peroxy group (O—O), a phosphono group (—(O)$_2$P=O), a phosphate group (O=P—(O)$_3$), a sulfonyl group ((O=)$_2$S), a sulfinyl group (O=S), a sulfonate ester group ((O=)$_2$S—O), a sulfonate ester group (O=S—O), and combinations thereof; Y is selected from a substituted or unsubstituted aliphatic alkyl group, a substituted or unsubstituted aromatic alkyl group, a heterocyclic group, a siloxane group, an ethylene glycol group, an imide group, and combinations thereof; and n is greater than 1, and wherein the ratio of the molar amount of nitroxide (NO·) groups of component (C) to the molar amount of the peroxide bonds of component (B) is from 0.170:1.000 to 1.000:1.000 (hereinafter "Crosslinked Composition 2").

In an embodiment, the crosslinked composition is a thermally treated composition comprising (A) an ethylene/propylene/ENB interpolymer having an ENB content from 4 wt %, or 4.5 wt % to 5 wt %, or 5.5 wt %; (B) a peroxide comprising at least one —O—O-peroxide bond; and (C) a bis-TEMPO compound having the Structure I:

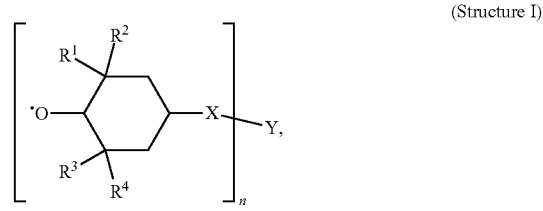

(Structure I)

wherein $R^1$, $R^2$, $R^3$ and $R^4$ are each independently selected from H and $C_1$-$C_6$ alkyl groups; X is selected from S, O, N, P, Se, a carbonyl group (C=O), a carboxyl group (O—C=O), an amide group (N—C=O), an azo group (N=N), an imino group (C=N), a carbamate group (N—C=O), a peroxy group (O—O), a phosphono group (—(O)$_2$P=O), a phosphate group (O=P—(O)$_3$), a sulfonyl group ((O=)$_2$S), a sulfinyl group (O=S), a sulfonate ester group ((O=)$_2$S—O), a sulfonate ester group (O=S—O), and combinations thereof; Y is selected from a substituted or unsubstituted aliphatic alkyl group, a substituted or unsubstituted aromatic alkyl group, a heterocyclic group, a siloxane group, an ethylene glycol group, an imide group, and combinations thereof; and n is greater than 1, and wherein the ratio of the molar amount of nitroxide (NO·) groups of component (C) to the molar amount of the peroxide bonds of component (B) is from 0.175:1.000 to 0.400:1.000 (hereinafter "Crosslinked Composition 3").

In an embodiment, the crosslinked composition is Crosslinked Composition 1, Crosslinked Composition 2, or Crosslinked Composition 3 and has an MH from 14.00 dNm, or 15.00 dNm, or 16.00 dNm to 17.00 dNm, or 18.00 dNm, or 19.00 dNm, as measured in accordance with ASTM D-5289.

In an embodiment, the crosslinked composition is Crosslinked Composition 1, Crosslinked Composition 2, or Crosslinked Composition 3 and has a ML from 0.35 dNm, or 0.40 dNm, or 0.45 dNm, or 0.50 dNm, or 0.55 dNm to 0.60 dNm, or 0.65 dNm, or 0.70 dNm, or 0.75 dNm, as measured in accordance with ASTM D-5289.

In an embodiment, the crosslinked composition is Crosslinked Composition 1, Crosslinked Composition 2, or Crosslinked Composition 3 and has a MH-ML from 14.00 dNm, or 14.25 dNm, or 14.50 dNm, or 14.75 dNm, or 15.00 dNm, or 15.25 dNm, or 15.50 dNm, or 15.75 dNm, or 16.00 dNm to 16.25 dNm, or 16.50 dNm, of 16.75 dNm, or 17.00 dNm, or 17.25 dNm, or 17.50 dNm, or 17.75 dNm, or 18.00 dNm, or 18.25 dNm, or 18.50 dNm, or 18.75 dNm, or 19.00 dNm, as measured in accordance with ASTM D-5289.

In an embodiment, the crosslinked composition is Crosslinked Composition 1, Crosslinked Composition 2, or Crosslinked Composition 3 and has a ts1 from 0.40 min., or 0.45 min., or 0.50 min., or 0.55 min., or 0.60 min., or 0.65 min., or 0.70 min. to 0.75 min., or 0.80 min., or 0.85 min., or 0.90 min., or 0.95 min., or 1.00 min., or 1.05 min., or 1.10 min., as measured in accordance with ASTM D-5289.

In an embodiment, the crosslinked composition is Crosslinked Composition 1, Crosslinked Composition 2, or Crosslinked Composition 3 and has a ts2 from 0.50 min., or 0.60 min., or 0.70 min., or 0.80 min. to 0.90 min., or 1.00 min., or 1.10 min., or 1.20 min., or 1.30 min., or 1.35 min., as measured in accordance with ASTM D-5289.

In an embodiment, the crosslinked composition is Crosslinked Composition 1, Crosslinked Composition 2, or Crosslinked Composition 3 and has a $t_{90}$ from 7.00 min., or 7.05 min., or 7.10 min., or 7.15 min., or 7.20 min., or 7.25 min., or 7.30 min., or 7.35 min., or 7.40 min. to 7.45 min., or 7.50 min., or 7.55 min., or 7.60 min., or 7.65 min., or 7.70 min., or 7.75 min., or 7.80 min., or 7.85 min., or 7.90 min., or 7.95 min., or 8.00 min., or 8.20 min., or 8.40 min., or 8.60 min., or 8.80 min., or 9.00 min., or 9.50 min., as measured in accordance with ASTM D-5289

In an embodiment, the crosslinked composition is hot air vulcanized to form an article.

In an embodiment, Crosslinked Composition 1 is hot air vulcanized to form Article 1.

In an embodiment, Crosslinked Composition 2 is hot air vulcanized to form Article 2.

In an embodiment, Crosslinked Composition 3 is hot air vulcanized to form Article 3.

In an embodiment, the hot air vulcanized crosslinked article is Article 1, Article 2 or Article 3 and has a $H_{1714}$ from less than 50, or less than 45, or less than 40, or less than 35, or less than 30, or less than 25 to 20, or 10, or 9, or 8, or 7, or 6, or 5, or 4, or 3, or 2, or 1, or greater than 0.

In an embodiment, the hot air vulcanized crosslinked article is Article 1, Article 2 or Article 3 and has a $H_{1460}$ from 170, or 175, or 180, or 185, or 190 to 192, or 194, or 196, or 198, or 199, or 200, or 205, or 210.

In an embodiment, the hot air vulcanized crosslinked article is Article 1, Article 2 or Article 3 and has a degradation degree from greater than 0.000, or 0.020, or 0.040, or 0.060, or 0.080, or 0.100, or 0.120, or 0.140, or 0.160 to 0.180, or 0.200, or 0.220, or 0.240, or 0.260, or 0.280, or 0.300.

In an embodiment, the hot air vulcanized crosslinked article has a relative degradation of less than 20%, or less than or equal to 15%, or less than or equal to 10%, or less than or equal to 5%, or less than or equal to 3%, or less than or equal to 2%, or less than or equal to 1%, or greater than 0%, or 0%.

In an embodiment, the hot air vulcanized crosslinked article is Article 1, Article 2 or Article 3 and has a relative degradation of less than 20%, or less than or equal to 15%, or less than or equal to 10%, or less than or equal to 5%, or less than or equal to 3%, or less than or equal to 2%, or less than or equal to 1%, or greater than 0%, or 0%.

In an embodiment, the crosslinked composition is Crosslinked Composition 1, Crosslinked Composition 2, or Crosslinked Composition 3 and comprises one, some or all of the following properties:
  (i) an MH from 16.00 dNm to 17.00 dNm, as measured in accordance with ASTM D-5289; and/or
  (ii) an ML from 0.450 dNm to 0.500 dNm, as measured in accordance with ASTM D-5289; and/or
  (iii) an MH-ML from 15.50 dNm to 17.00 dNm, as measured in accordance with ASTM D-5289; and/or
  (iv) a ts1 from 0.900 min. to 1.05 min; and/or
  (v) a ts2 from 1.10 min. to 1.20 min.; and/or
  (vi) a $t_{90}$ from 8.40 min. to 8.60 min.

In an embodiment, the crosslinked composition is Crosslinked Composition 1, Crosslinked Composition 2, or Crosslinked Composition 3 and comprises at least two, at least three, at least four, at least five, or all six of properties (i)-(vi).

In an embodiment, the crosslinked composition is Crosslinked Composition 1, Crosslinked Composition 2, or Crosslinked Composition 3 and comprises two properties of (i)-(vi). In an embodiment, the crosslinked composition is Crosslinked Composition 1, Crosslinked Composition 2, or Crosslinked Composition 3 and comprises properties (i) and (ii), or (i) and (iii), or (i) and (iv), or (i) and (v), or (i) and (vi), or (ii) and (iii), or (ii) and (iv), or (ii) and (v), or (ii) and (vi), or (iii) and (iv), or (iii) and (v), or (iii) and (vi), or (iv) and (v), or (iv) and (vi), or (v) and (vi).

In an embodiment, the crosslinked composition is Crosslinked Composition 1, Crosslinked Composition 2, or Crosslinked Composition 3 and comprises at least property (iii). In an embodiment, the crosslinked composition is Crosslinked Composition 1, Crosslinked Composition 2, or Crosslinked Composition 3 and comprises properties (iii) and at least one properties (i), (ii), (iv), (v) and (vi), preferably at least one of (i) and (ii).

In an embodiment, the crosslinked composition is hot air vulcanized to form Article 1, Article 2, or Article 3 and comprises one, some or all of the following properties:
  (i) an $H_{1714}$ from less than 25, or less than 10, or less than 5 to 4, or 3, or 2, or 1; and/or
  (ii) an $H_{1460}$ from 170, or 180 to 190, or 195, or 200, or 210; and/or (iii) a degradation degree from 0.005, or 0.010, or 0.015, or 0.020, or 0.025, or 0.050, or 0.100 to 0.150, or 0.200, or 0.250, or 0.300; and/or (iv) a relative degradation of less than or equal to 20%, or less than or equal to 10%, or less than 5%, or less than 3%, or less than 2%.

In an embodiment, the hot air vulcanized crosslinked article is Article 1, Article 2, or Article 3 and comprises at least two, or at least three, or all four of properties (i)-(iv).

In an embodiment, the hot air vulcanized crosslinked article is Article 1, Article 2, or Article 3 and comprises two of properties (i)-(iv). In an embodiment, the hot air vulcanized crosslinked article is Article 1, Article 2, or Article 3 and comprises properties (i) and (ii), or (i) and (iii), or (i) and (iv), or (ii) and (iii), or (ii) and (iv), or (iii) and (iv). In an embodiment, the hot air vulcanized crosslinked article is Article 1, Article 2, or Article 3 and comprises properties (iii) and (iv).

In an embodiment, the hot air vulcanized crosslinked article is Article 1, Article 2, or Article 3 and comprises three of properties (i)-(iv). In an embodiment, the hot air vulcanized crosslinked article is Article 1, Article 2, or Article 3 and comprises properties (i), (ii) and (iii); or (i), (ii) and (iv); or (i), (iii) and (iv); or (ii), (iii) and (iv).

In an embodiment, the hot air vulcanized crosslinked article is Article 1, Article 2, or Article 3 and comprises all four of properties (i)-(iv).

In an embodiment, the composition is Crosslinked Composition 1, Crosslinked Composition 2, or Crosslinked Composition 3 and comprises one, some or all of the following properties:

(i) an MH from 16.00 dNm to 17.00 dNm, as measured in accordance with ASTM D-5289; and/or (ii) an ML from 0.450 dNm to 0.500 dNm, as measured in accordance with ASTM D-5289; and/or (iii) an MH-ML from 16.00 dNm to 16.75 dNm, as measured in accordance with ASTM D-5289;

(iv) a ts1 from 0.900 min. to 1.00 min.; and/or (v) a ts2 from 1.100 min. to 1.170 min; and/or (vi) a $t_{90}$ from 8.300 min. to 8.500 min., and the composition is hot air vulcanized into a crosslinked article having one some or all of the following properties:

(vii) an $H_{1714}$ from less than or equal to 20 to greater than 0; and/or (viii) an $H_{1460}$ from 190 to 205; and/or (ix) a degradation degree from greater than 0.000 to 0.200; and/or (x) a relative degradation of less than or equal to 20%, or less than or equal to 10%, or less than or equal to 5%, or less than or equal to 1%.

In an embodiment, the crosslinked composition is Crosslinked Composition 1, Crosslinked Composition 2, or Crosslinked Composition 3 and comprises at least two, at least three, at least four, at least five, or all six of properties (i)-(vi) and the hot air vulcanized crosslinked article comprises at least one, at least two, at least three, or all four of properties (vii)-(x).

In an embodiment, the crosslinked composition is Crosslinked Composition 1, Crosslinked Composition 2, or Crosslinked Composition 3 and comprises at least one of properties (i)-(vi) and the hot air vulcanized crosslinked article comprises at least one of properties (vii)-(x). In an embodiment, the crosslinked composition is Crosslinked Composition 1, Crosslinked Composition 2, or Crosslinked Composition 3 and comprises at least property (iii) and the hot air vulcanized crosslinked article comprises at least property (ix) or (x). In an embodiment, the crosslinked composition is Crosslinked Composition 1, Crosslinked Composition 2, or Crosslinked Composition 3 and comprises at least property (iii) and the hot air vulcanized crosslinked article comprises at least property (x).

Applicant surprisingly discovered that an EAODM composition composed of (A) an EAODM, (B) a peroxide having at least one —O—O— peroxide bond, and (C) a bis-TEMPO compound having the Structure I as disclosed herein, wherein the ratio of the molar amount of nitroxide (NO·) groups of component (C) to the molar amount of the peroxide bonds of component (B) is from 0.10 to 2.00, exhibits good crosslinking and low degradation. Specifically, Applicant discovered that a composition comprising, based on the total weight of the composition, (A) from 90 wt % to 99 wt % ethylene/propylene/diene interpolymer, (B) from 0.5 wt % to 2.0 wt % peroxide containing at least one —O—O— peroxide bond, and (C) from 0.25 wt % to 2.0 wt % of a bis-TEMPO compound having the Structure I as disclosed herein, wherein the ratio of the molar amount of nitroxide (NO·) groups of component (C) to the molar amount of the peroxide bonds of component (B) is from 0.10 to 2.00 exhibits a relative degradation less than 20%, or less than 10%, or less than 5%, or less than 3%, or less than 2%.

In an embodiment, the article is selected from profiles, injection molded parts, gaskets, automotive parts, building and construction materials, shoe components, and tubes.

In an embodiment, the article is an automotive part.

EXPERIMENTAL

I. Materials Used

A: an ethylene/propylene/ENB terpolymer having a density of 0.88 g/cc measured according to ASTM D792; and ethylene content of 70 wt % measured according to ASTM D3900; an ENB content of 4.9 wt % measured according to ASTM D6049; and a Mooney Viscosity (ML 1+4 at 125° C., ASTM D1646) of 25 measured according to ASTM D6047 available as NORDEL IP 4725 from the Dow Chemical Company.

B: 2,5-dimethyl-2,5-di(t-butylperoxy)hexane, available as LUPEROX® 101 from Arkema.

C1: 2,4-diphenyl-4-methyl-1-pentene, having the Structure IV and available from Sigma Aldrich:

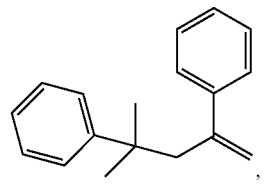

(Structure IV)

C2: 1,1-diphenylethylene, having the Structure V and available from Sigma Aldrich:

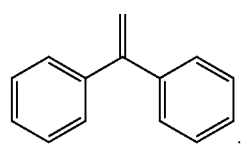

(Structure V)

C3: 1,3-diisopropenylbenzene, having the Structure VI and available from Sigma Aldrich:

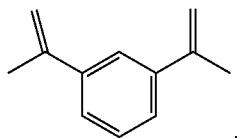

(Structure VI)

C4: trimethylolpropane triacrylate, having the Structure VII and available from Sigma Aldrich:

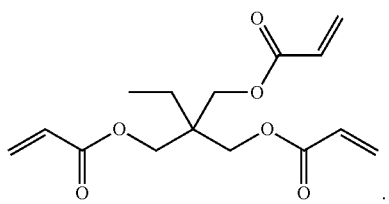

(Sturcture VII)

C5: 1,6-hexanediol diacrylate, having the Structure VIII and available from Sigma Aldrich:

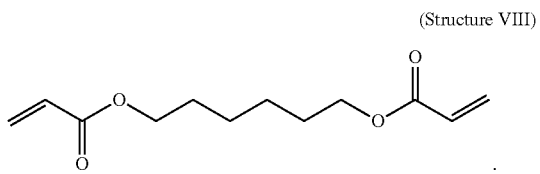 [SMILES: C=CC(=O)OCCCCCCOC(=O)C=C]

(Structure VIII)

C6: 1,3,5-triallyl-1,3,5-triazine-2,4,6(1H,3H,5H)-trione, having the Structure IX and available from Sigma Aldrich:

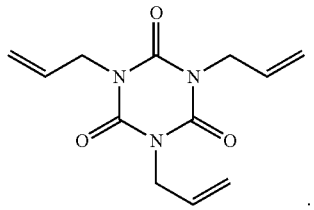

(Structure IX)

C7: piperidinoxy,4-hydroxy-2,2,6,6-tetramethyl, sebacate, having the Structure II and available from Shanghai Yuanye Bio-Technology Co., Ltd:

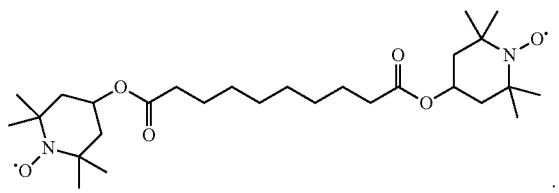

(Structure II)

C8: 4-hydroxy-2,2,6,6-tetramethylpiperidin-1-oxyl, having the Structure X and available from Sigma Aldrich:

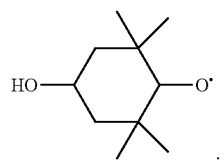

(Structure X)

D1: 2,2,4-trimethyl-1,2-dihydroquinoline, polymerized, available as TMQ (Vulkanox HS/LG) from Lanxess.

Mixer: Haake Polylab OS mixer (69 mL volume).

Press: LabTech LP-S-50/ASTM laboratory hydraulic press.

FT-IR: Perkin Elmer Spectrum 100 FTIR Spectrometer with single bounce ATR with diamond crystal.

II. Preparation of Samples

The Haake mixer is preheated and equilibrated at 100° C. The EPDM, peroxide and bis-TEMPO compound (and any other additives) are added as set forth in Tables 1A and 1B, below. Mixing is started with 35 rotations per minute (rpm) at 100° C. for 4 minutes to afford the final blend. The blend is removed from the mixer and cold pressed into a sheet. The sheet is further fabricated to a 1 mm thickness using the roll mill at 75° C.

The ratio of the molar amount of nitroxide (NO·) groups of component (C) to the molar amount of the peroxide bonds of component (B) is calculated according to the equation $$\text{ratio} = \frac{g_t * \frac{\text{mole}_t}{g} * (\text{number of nitroxide groups})}{g_p * \frac{\text{mole}_p}{g} * (\text{number of peroxide bonds})}$$

wherein $g_t$ is the amount of bis-TEMPO compound in grams, $\text{mole}_t/g$ is the moles of bis-TEMPO compound in one gram, the number of nitroxide groups is the number of nitroxide groups in one bis-TEMPO molecule, $g_p$ is the amount of peroxide in grams, $\text{mole}_p/g$ is the moles of peroxide in one gram, and the number of peroxide bonds is the number of peroxide bonds in one peroxide molecule.

For example, with respect to IE1, the amount of bis-TEMPO compound used is 0.5 g, 1 mole of bis-TEMPO compound is 510 g, the number of nitroxide groups in a single bis-TEMPO molecule is 2, the amount of peroxide used is 1.5 g, 1 mole of peroxide is 209 g, and the number of peroxide bonds in a single peroxide molecule is 2. The ratio is calculated as follows:

$$\text{ratio} = \frac{g_t * \frac{\text{mole}_t}{g} * (\text{number of nitroxide groups})}{g_p * \frac{\text{mole}_p}{g} * (\text{number of peroxide bonds})} = \frac{0.5 * \frac{1}{510} * 2}{1.5 * \frac{1}{290} * 2} = 0.189$$

TABLE 1A

Formulations of Comparative Samples (CS)

|   | CS1 | CS2 | CS3 | CS4 | CS5 | CS6 | CS7 | CS8 | CS9 | CS10 |
|---|---|---|---|---|---|---|---|---|---|---|
| A | 98.33 | 97.85 | 97.85 | 97.85 | 97.85 | 97.85 | 97.85 | 97.26 | 98.28 | 97.56 |
| B | 1.47 | 1.47 | 1.47 | 1.47 | 1.47 | 1.47 | 1.47 | 2.63 | 1.47 | 1.46 |
| C1 |  | 0.48 |  |  |  |  |  |  |  |  |
| C2 |  |  | 0.48 |  |  |  |  |  |  |  |
| C3 |  |  |  | 0.48 |  |  |  |  |  |  |
| C4 |  |  |  |  | 0.48 |  |  |  |  |  |
| C5 |  |  |  |  |  | 0.48 |  |  |  |  |
| C6 |  |  |  |  |  |  | 0.48 |  |  |  |
| C7 |  |  |  |  |  |  |  | 0.11 | 0.25 |  |
| C8 |  |  |  |  |  |  |  |  |  | 0.98 |
| D1 | 0.10 | 0.10 | 0.10 | 0.10 | 0.10 | 0.10 | 0.10 |  |  |  |
| D2 | 0.10 | 0.10 | 0.10 | 0.10 | 0.10 | 0.10 | 0.10 |  |  |  |
| ratio of the molar amount of nitroxide (NO•) groups of component (C) to the molar amount of the peroxide bonds of component (B) | 0 | NA | NA | NA | NA | NA | NA | 0.023:1.000 | 0.095:1.000 | 2.248:1.000 |

CS = comparative sample;
NA = not applicable

TABLE 1B

Formulations of Inventive Examples (IE)

|   | IE1 | IE2 | IE3 | IE4 |
|---|---|---|---|---|
| A | 97.85 | 96.62 | 97.56 | 98.04 |
| B | 1.47 | 1.45 | 1.46 | 1.47 |
| C7 | 0.48 | 1.93 | 0.98 | 0.49 |
| D1 | 0.10 |  |  |  |
| D2 | 0.10 |  |  |  |
| ratio of the molar amount of nitroxide (NO•) groups of component (C) to the molar amount of the peroxide bonds of component (B) | 0.189:1.000 | 0.757:1.000 | 0.378:1.000 | 0.189:1.000 |

IE = inventive example; NA = not applicable

III. Preparation of Compression Molded Disks

Each sample sheet (18 g) is placed into a steel mold (150 mm×100 mm×1 mm). The hydraulic press is preheated to 130° C. The steel mold is transferred into the press, degassed (10 MPa) six times at 130° C., and hot pressed with 10 MPa pressure at 130° C. for 1 minute. The steel mold is then cold pressed (water cooling circulating with the press) with 10 MEN for 5 minutes. The resulting test specimen is a compression molded sheet having dimensions 150 mm×100 mm×1 mm.

The MDR cure properties of each formulation set forth in Table 1 are measured in accordance with ASTM D-5289 and recorded in Table 2 below.

TABLE 2

MDR Properties of CS1-7, CS10-11, and IE1

|   | CS1 | CS2 | CS3 | CS4 | CS5 | CS6 | CS7 | CS10 | IE1 |
|---|---|---|---|---|---|---|---|---|---|
| MH (dNm) | 18.49 | 15.38 | 15.4 | 15.49 | 17.84 | 18.47 | 19.38 | 9.89 | 16.65 |
| ML (dNm) | 0.56 | 0.51 | 0.52 | 0.53 | 0.51 | 0.61 | 0.54 | 0.46 | 0.49 |
| MH − ML (dNm) | 17.9 | 14.9 | 14.9 | 15 | 17.3 | 17.9 | 18.8 | 9.43 | 16.2 |

TABLE 2-continued

| MDR Properties of CS1-7, CS10-11, and IE1 | | | | | | | | | |
|---|---|---|---|---|---|---|---|---|---|
| | CS1 | CS2 | CS3 | CS4 | CS5 | CS6 | CS7 | CS10 | IE1 |
| ts1 (min) | 0.647 | 0.878 | 0.888 | 0.801 | 0.698 | 0.463 | 0.633 | 1.94 | 0.928 |
| ts2 (min) | 0.817 | 1.232 | 1.265 | 1.077 | 0.862 | 0.622 | 0.79 | 2.48 | 1.163 |
| t90 (min) | 7.859 | 9.223 | 9.245 | 8.691 | 8.112 | 7.589 | 7.296 | 8.74 | 8.444 |

CS = comparative sample;
IE = inventive example
NA = not applicable

IV. Hot Air Vulcanization

A hot convection oven is preheated and equilibrated at 180° C. or 200° C. under ambient atmosphere. Compression molded samples are transferred into the oven and kept at 180° C. or 200° C. for 15 minutes with hot air convection for vulcanization. The vulcanized specimens are then removed and cooled to room temperature.

Degradation of the hot air vulcanized samples is determined by FTIR-ATR analysis as described above, and the tackiness of the surface of the samples is determined by the finger test. The results are reported in Tables 3A and 3B, below, and FIG. 1.

TABLE 3A

| FTIR-ATR and Finger Test Results for CS1-CS11 | | | | | | | | | | |
|---|---|---|---|---|---|---|---|---|---|---|
| | CS1 | CS2 | CS3 | CS4 | CS5 | CS6 | CS7 | CS8 | CS9 | CS10 |
| $H_{1714}$ | 148 | 112 | 96 | 85 | 138 | 115 | 97 | 121 | 54 | 181 |
| $H_{1460}$ | 146 | 152 | 167 | 168 | 154 | 157 | 166 | 145 | 168 | 124 |
| D | 1.014 | 0.737 | 0.575 | 0.506 | 0.896 | 0.732 | 0.584 | 0.834 | 0.321 | 1.460 |
| RD | 100% | 73% | 57% | 50% | 88% | 72% | 58% | 53% | 20% | 92% |
| Finger Test Rating | 1 | 1 | 1 | 1 | 1 | 1 | 1 | 1 | 2 | 1 |

CS = comparative sample

TABLE 3B

| FTIR-ATR and Finger Test Results for IE1-IE4 | | | | |
|---|---|---|---|---|
| | IE1 | IE2 | IE3 | IE4 |
| $H_{1714}$ | 20 | 2 | 4 | 4 |
| $H_{1460}$ | 191 | 202 | 192 | 195 |
| D | 0.105 | 0.01 | 0.021 | 0.021 |
| RD | 10% | 1% | 1% | 1% |
| Finger Test Rating | 3 | 3 | 3 | 3 |

IE = inventive example

Comparative Sample 1 does not include a bis-TEMPO compound. CS1 is the control sample having a formulation of only ethylene/alpha-olefin/diene interpolymer, peroxide and additives. As shown in Table 3, CS1 has a very tacky surface and significant degradation (1.014 degradation). Comparing CS1 to CS2-CS8 shows that addition of the C1-C7 compounds alone, without regard for the ratio of the molar amount of nitroxide groups in the C1-C7 compounds to the molar amount of the peroxide bonds in component B, does not necessarily improve surface tackiness or degradation of hot air vulcanized samples. Rather, as shown by IE1-IE4, it is only when the ratio of the molar amount of nitroxide groups in the component C to the molar amount of the peroxide bonds in component B is from 0.10 to 2.00 that improvement in surface tackiness and degradation is observed.

As shown by IE1-IE4, using a bis-TEMPO compound having the Structure I (as defined herein) in combination with a peroxide such that the ratio of the molar amount of nitroxide (NO·) groups of component (C) to the molar amount of the peroxide bonds of component (B) is from 0.10 to 2.00 results in a stable and non-tacky sample. For example, CS8 and CS9 each use a bis-TEMPO compound/peroxide combination in which the ratio of the molar amount of nitroxide (NO·) groups of component (C) to the molar amount of the peroxide bonds of component (B) is outside 0.10:2.00 and each of CS8 and CS9 has a tacky surface (finger test rating of 1 or 2) and relative degradation of greater than or equal to 20%. In contrast, IE1-IE4 each have a finger test rating of 3. Moreover, each of IE1-IE4 has a relative degradation of less than 20%, and, in fact, each has a relative degradation of less than or equal to 10%.

As shown in Table 2, CS1-CS7 and IE1 each retain sufficient crosslinking, regardless of the presence of a bis-TEMPO compound or the ratio of the molar amount of nitroxide (NO·) groups of component (C) to the molar amount of the peroxide bonds of component (B). However, and importantly, the inventive examples show an excellent balance of crosslinking density and surface stability during hot air vulcanization. This is shown by IE1 which has a surface tackiness rating of 3, a relative degradation of less than or equal to 20% (i.e., 10%), and an MH-ML of greater than 14.00 dNm (i.e., 16.2 dNm).

Additionally, CS10 shows that incorporating a bis-TEMPO compound having the Structure I as defined herein wherein n is 1 results in decreased crosslinking density and decreased surface stability. CS10 has worse (lower) MH compared to both CS1 (9.89 versus 18.45) and IE1 (9.89 versus 16.65). CS10 also has a higher relative surface degradation compared to IE1 (92% versus 10%).

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A composition comprising:
a reaction product of
(A) from 96 wt % to 98 wt % of a crosslinkable polymer consisting of an ethylene/propylene/5-ethylidene-2-norbornene interpolymer, the ethylene/propylene/5-ethylidene-2-norbornene interpolymer with from 60 wt % to 80 wt % of ethylene, based on the total weight of the ethylene/propylene/5-ethylidene-2-norbornene interpolymer, 10 wt % to 35 wt % of propylene, based on the total weight of the ethylene/propylene/5-ethylidene-2-norbornene interpolymer, and from greater than 3 wt % to 7 wt % of 5 ethylidene-2-norbornene, based on the total weight of the ethylene/propylene/5-ethylidene-2-norbornene interpolymer, wherein the ethylene, the propylene, and the 5-ethylidene-2-norbornene amount to 100 wt % of the crosslinkable polymer;
(B) from 1.25 wt % to 1.48 wt % of a peroxide comprising at least one —O—O— peroxide bond, based on the total weight of the composition;
(C) from 0.25 wt % to 2.0 wt % of piperidinoxy,4-hydroxy-2,2,6,6-tetramethyl sebacate compound having Structure I, based on the total weight of the composition:

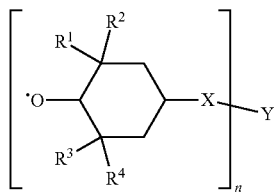

(Structure I)

wherein the ratio of the molar amount of nitroxide (NO·) groups of the component (C) to the molar amount of the peroxide bonds of the component (B) is from 0.180:1.000 to 0.900:1.000;

wherein the (A), the (B), and the (C) amount to 100 wt % of the composition, the reaction product is crosslinked and has a degradation degree from greater than 0.000 to 0.200, a difference between maximum torque MH and minimum torque (MH-ML) of from 15.50 dNm to 17.00 dNm, an FTIR-ATR degradation $H_{1460}$ from 190 to 205, and a FTIR-ATR degradation $H_{1714}$ value from less than or equal to 20 to greater than 0.

2. The composition of claim 1, wherein the ethylene/propylene/5-ethylidene-2-norbornene interpolymer has a Mooney Viscosity from 15 to 40 (ML 1+4, 125° C.).

3. A crosslinked reaction product formed by thermally treating the composition of claim 1 at a temperature from 50° C. to 150° C.

4. An article comprising at least one component formed from the crosslinked reaction product of claim 1.

5. The article of claim 4, wherein the article is selected from the group consisting of a profile, injection molded part, gasket, automotive part, building material, construction material, shoe component, and tube.

6. The article of claim 4, wherein the article has a finger test rating of 3.

7. The article of claim 4, wherein the article has a relative degradation of less than or equal to 10%).

* * * * *